United States Patent
Von Novak (10) Patent No.: US 9,819,228 B2
(45) Date of Patent: Nov. 14, 2017

(54) ACTIVE AND ADAPTIVE FIELD CANCELLATION FOR WIRELESS POWER SYSTEMS

(71) Applicant: QUALCOMM Incorporated, San Diego, CA (US)

(72) Inventor: William H. Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 13/783,108

(22) Filed: Mar. 1, 2013

(65) Prior Publication Data

US 2014/0246916 A1    Sep. 4, 2014

(51) Int. Cl.
*H02J 17/00* (2006.01)
*H02J 5/00* (2016.01)

(52) U.S. Cl.
CPC ............. *H02J 17/00* (2013.01); *H02J 5/005* (2013.01)

(58) Field of Classification Search
CPC .......... H02J 17/00; H02J 5/005; H01Q 13/10; H01Q 9/04; H01J 29/56
USPC ........................................................ 307/104
See application file for complete search history.

(56) References Cited

U.S. PATENT DOCUMENTS

| | | | | |
|---|---|---|---|---|
| 3,983,475 A * | 9/1976 | Watanabe | ............... | G01R 33/04 324/254 |
| 5,061,941 A | 10/1991 | Lizzi et al. | | |
| 5,534,756 A * | 7/1996 | Beeteson | ............... | H01J 29/003 315/370 |
| 5,635,939 A * | 6/1997 | Chekroun | ................. | G01S 3/38 342/384 |
| 6,366,254 B1 * | 4/2002 | Sievenpiper et al. | ........ | 343/770 |
| 7,355,396 B1 * | 4/2008 | Chi | ..................... | G01R 33/0354 324/244 |
| 7,436,120 B2 * | 10/2008 | Buschbeck | ............... | G05F 7/00 315/8 |

(Continued)

FOREIGN PATENT DOCUMENTS

| | | |
|---|---|---|
| CN | 102694422 A | 9/2012 |
| CN | 103107585 A | 5/2013 |

(Continued)

OTHER PUBLICATIONS

Texas Instruments, "sensor signal conditioning IC for closed loop magnetic current sensor," May 2009,pp. 1-25.*

(Continued)

*Primary Examiner* — Thienvu Tran
*Assistant Examiner* — Pinping Sun
(74) *Attorney, Agent, or Firm* — Knobbe, Martens, Olson & Bear, LLP (57) ABSTRACT

This disclosure provides methods and apparatus, including computer-readable media, for wireless power transfer and particularly active cancellation of undesirable electric or magnetic field emissions from a wireless power transmitter. In one aspect, the disclosure provides for an apparatus including a sensor, controller, and emitter, wherein the sensor is used to sense the electric or magnetic field emissions from a transmit antenna, the controller configured to determine the undesirable components of the field, and the emitter to generate a field to destructively interfere with the undesirable components.

23 Claims, 7 Drawing Sheets

(56) References Cited

U.S. PATENT DOCUMENTS

| | | | | |
|---|---|---|---|---|
| 7,919,964 B2* | 4/2011 | Bosnar | | G01V 11/00 324/239 |
| 8,208,865 B2* | 6/2012 | Mikhemar | | H04B 1/18 343/700 MS |
| 8,810,071 B2* | 8/2014 | Sauerlaender | | H02J 5/005 307/104 |
| 8,817,925 B2* | 8/2014 | Husted et al. | | 375/346 |
| 8,934,857 B2* | 1/2015 | Low | | H02J 7/025 307/104 |
| 2004/0042150 A1 | 3/2004 | Swinbanks et al. | | |
| 2004/0213676 A1* | 10/2004 | Phillips et al. | | 417/44.11 |
| 2011/0025133 A1* | 2/2011 | Sauerlaender | | H02J 5/005 307/104 |
| 2011/0080056 A1 | 4/2011 | Low et al. | | |
| 2011/0084782 A1* | 4/2011 | Kanno | | H01Q 1/38 333/202 |
| 2011/0090126 A1* | 4/2011 | Szini | | H01Q 1/245 343/702 |
| 2011/0241438 A1* | 10/2011 | Kim et al. | | 307/104 |
| 2011/0254377 A1* | 10/2011 | Wildmer | | B60L 11/182 307/104 |
| 2012/0161535 A1* | 6/2012 | Jung et al. | | 307/104 |
| 2012/0242161 A1 | 9/2012 | Kudo et al. | | |
| 2012/0262002 A1* | 10/2012 | Widmer et al. | | 307/104 |
| 2013/0029625 A1* | 1/2013 | Park | | H01Q 1/243 455/272 |
| 2013/0081261 A1* | 4/2013 | Pienkowski | | H01Q 7/005 29/600 |
| 2013/0099589 A1* | 4/2013 | An | | 307/104 |
| 2014/0161159 A1* | 6/2014 | Black | | H04B 15/00 375/219 |

FOREIGN PATENT DOCUMENTS

| | | | | |
|---|---|---|---|---|
| EP | 1962365 A1 | | 8/2008 | |
| EP | 2541792 A1 | | 1/2013 | |
| JP | EP 1919027 A1 * | | 5/2008 | H01Q 1/24 |
| JP | 2012135066 A | | 7/2012 | |
| WO | WO-2007031897 A1 | | 3/2007 | |

OTHER PUBLICATIONS

International Search Report and Written Opinion—PCT/US2014/017589—ISA/EPO—Jul. 15, 2014.

* cited by examiner

ACTIVE AND ADAPTIVE FIELD CANCELLATION FOR WIRELESS POWER SYSTEMS

FIELD

The present invention relates generally to wireless power. More specifically, the disclosure is directed to methods and apparatus which may be used to reduce an undesirable portion of a sensed electric or magnetic fields.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for reducing unwanted emissions in a system for wirelessly transferring power via a magnetic field at a resonant frequency, the method comprising sensing a field, via a sensor, generated by a wireless power transmit antenna, generating a signal representative of a portion of the sensed field, and driving an emitter based at least in part on the signal to generate a field which reduces at least part of the portion of the sensed field.

Another aspect of the disclosure provides an apparatus for reducing unwanted emissions in a system for wirelessly transferring power via a magnetic field at a resonant frequency, the apparatus comprising a sensor configured to sense a field generated by a wireless power transmit antenna, a controller configured to generate a signal representative of a portion of the sensed field, and an emitter configured to generate a field based at least in part on the signal, the field reducing at least part of the portion of the sensed field.

Another aspect of the disclosure provides an apparatus for reducing unwanted emissions in a system for wirelessly transferring power via a magnetic field at a resonant frequency, the apparatus comprising means for sensing a field generated by a wireless power transmit antenna, means for generating a signal representative of a portion of the sensed field, and means for emitting a field based at least in part on the signal to reduce at least part of the portion of the sensed field.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Magnetic induction may be used to efficiently transfer power wirelessly from a transmitter to a receiver. The transmitter and receiver include antennas tuned to resonate at a particular frequency. The transmitter energizes the transmit antenna with a signal at the resonant frequency, which in turn energizes the receive antenna such that energy may be extracted at the receiver. To the extent the magnetic field deviates from the resonant frequency of the system, the efficiency of the system may be reduced. Further, out-of-band (i.e., not at the resonant frequency of an antenna) emissions may exceed regulatory levels and result in reduced electromagnetic compatibility and compliance. To improve efficiency and achieve regulatory compliance, active cancellation techniques may be used to eliminate unwanted or undesirable electric or magnetic fields. These techniques involve placing a sensor in the near field of the transmit antenna. Based on the sensed field, an emitter may be driven to generate a field which destructively interferes with the undesirable or unwanted portions of the field generated by the transmit antenna, resulting in reduced out-of-band emissions and improved transfer efficiency. These techniques may be used in combination with other passive techniques, including shielding and filtering.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields (E-fields), magnetic fields (H-fields), electromagnetic fields (EM fields), or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

Figure 1:
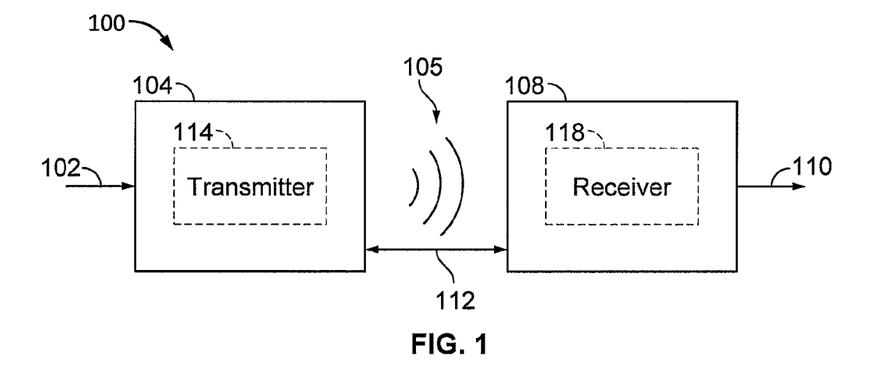
FIG. 1 is a functional block diagram of an exemplary wireless power transfer system, in accordance with exemplary embodiments of the invention.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far-field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
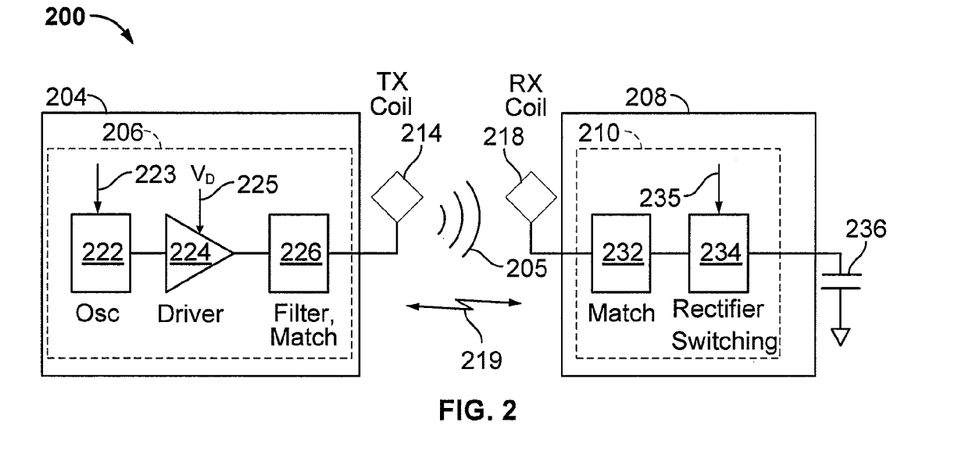
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236.

Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
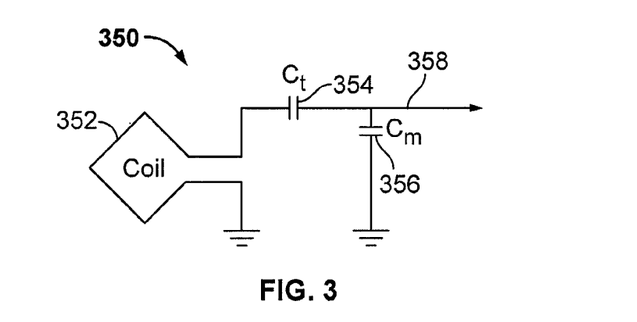
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
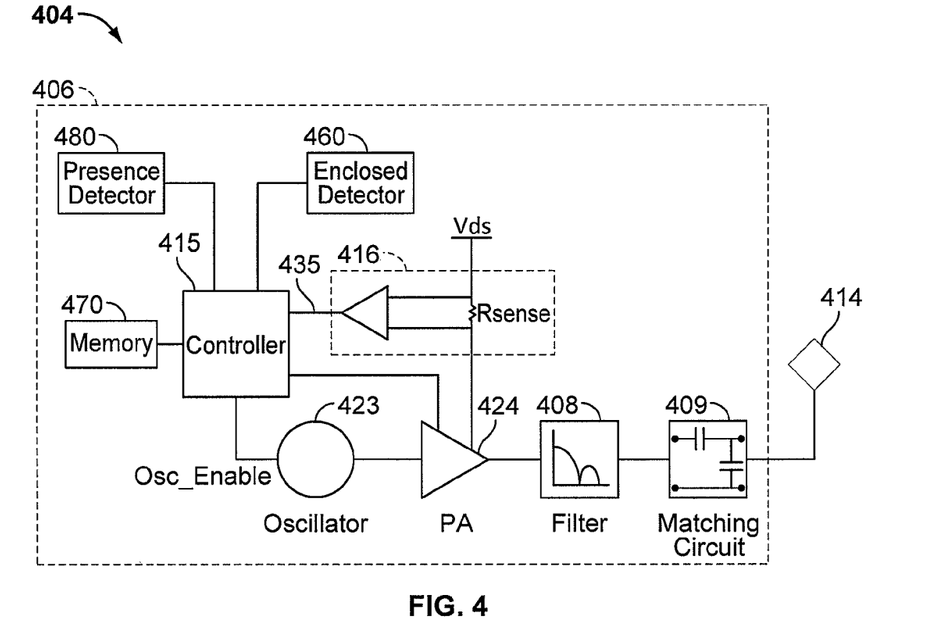
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz or 13.56 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
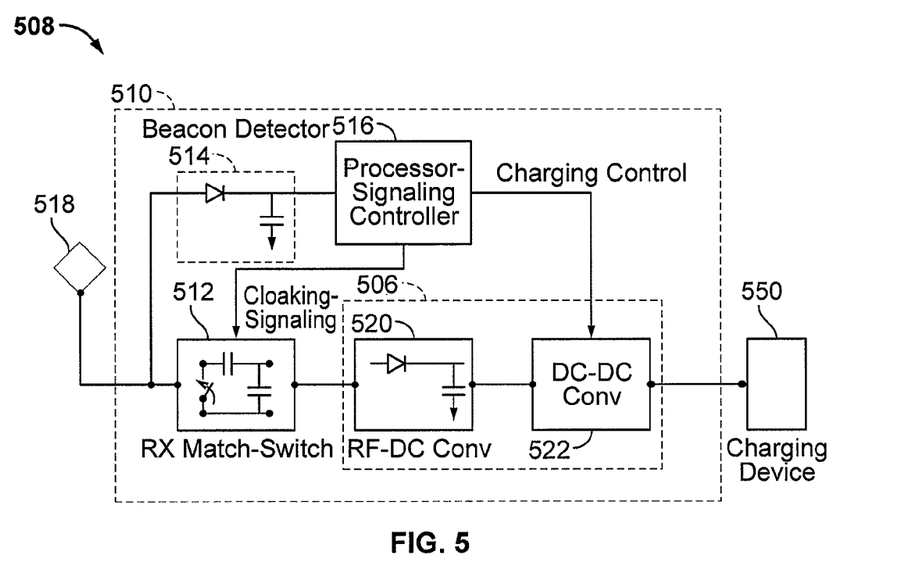
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$.

Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 µsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Wireless power transmission may be subject to regulations established and enforced by various governing bodies (e.g., the United States Federal Communications Commission, the European Telecommunications Standards Institute, the International Organization for Standardization, and the International Commission on Non-Ionizing Radiation Protection). These regulations are intended to reduce electromagnetic interference between electronic devices and to protect biological systems from harmful electromagnetic field levels. The limits on field levels may be presented as electric field strength (V/m), magnetic field strength (A/m), and/or power density (W/m$^2$) for a frequency or frequency band at some distance from the emitter. Subject to the jurisdiction of any governing bodies, compliance with any applicable regulations may be required in order for devices or products to be sold or used within a particular market. As such, one object of the present disclosure is to improve electromagnetic compatibility (EMC) of wireless power transfer systems.

In addition to EMC, another object of the present disclosure is to improve the performance of a wireless power transfer system. In particular, in the wireless power transfer systems that employ resonant inductive coupling described above, it may be desirable to remove or reduce any stray, undesirable, and/or unintentionally radiated electromagnetic fields. An H-field used to transfer power that more closely matches a sinusoidal oscillation at the resonant frequency of the transmitter and receiver may reduce power losses and improve the efficiency of the wireless power transfer system.

Various passive techniques may be used to achieve the aforementioned objects of the present disclosure. These passive techniques may include shielding of transmit circuitry, careful design of the transmit antenna, shielding of the charging area, and filtering. For example, a transmitter may include one or more filters to remove undesirable signal components from reaching and being radiated by the transmit antenna (e.g., the filter and matching circuit 226 in FIG. 2 or the low pass filter 408 in FIG. 4). As another example, electromagnetic shielding may be used in the charging area to block EM fields at certain frequencies and to direct EM fields at desired frequencies via apertures or openings.

Figure 6:
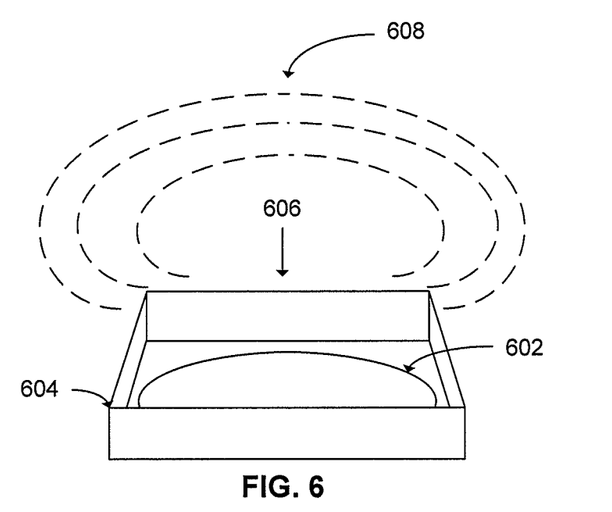
FIG. 6 depicts an exemplary shielded transmitter arrangement.

FIG. 6 depicts an exemplary shielded transmitter arrangement. A transmit antenna 602 is disposed on an inner surface of a shielded structure 604. Shielded structure 604 includes an opening 606 to allow the transmit antenna 602 to transfer power to a receive antenna via field 608. While shielded structure 604 is illustrated as a shallow box with a single opening, shield structure of other sizes and shapes may be used, including those that may include more than one opening. The shielding may encompass the transmit antenna as shown in FIG. 6 and further shield any transmitter electronics. The shielding may also take on different shapes or configurations depending on the design of the transmit antenna. The shielding may also be localized to particular transmitter components.

Figure 7:
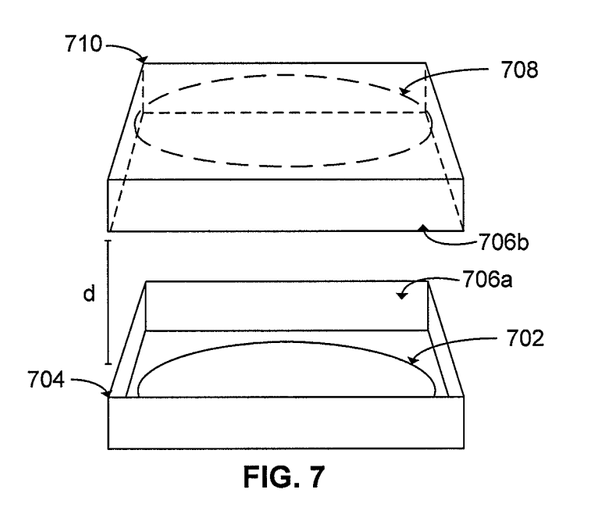
FIG. 7 depicts an exemplary shielded transmitter arrangement with a nearby receiver.

FIG. 7 depicts an exemplary shielded transmitter arrangement with a nearby receiver. Again, a transmit antenna 702 is disposed in a shielded structure 704. Similarly, a receive antenna 708 is disposed in another shielded structure 710. Openings 706a and 706b are aligned. As the distance d between the shields is reduced, so too is the amount of stray or undesirable E- or H-field. Of course, depending on the size and shape of a wireless power receiver, the shielding configuration of FIG. 7 may not be practical (e.g., where the wireless power receiver is a mobile phone.)

While passive techniques may reduce unwanted field emissions, it may be desirable to include a form of active field cancellation to remove or reduce any stray, undesirable, and/or unintentionally radiated electromagnetic field. Of course, while absolute cancellation may be desirable, in practice the cancellation may be limited to reduction or attenuation of the undesirable portion of the field. The following active cancellation techniques may be used to achieve the aforementioned objects of the present disclosure. These active techniques may be used in combination with the aforementioned passive techniques.

One active technique involves actively cancelling undesired E- or H-fields generated by a transmitter by emitting another opposing E- or H-field. Various sensors, described below, may be used to sense the electromagnetic near-field components radiated from a transmitter. Depending on whether the emissions are due to current(s) or voltage(s), near-field emissions may be predominately H- or E-field. To cancel the undesired portion of the sensed field, a processor may be configured to determine the undesired portion and to generate a corresponding cancellation signal. The cancellation signal may drive an emitter to generate a cancellation field that destructively interferes with the undesired portion of the sensed field. Cancellation of either undesirable H- or E-fields in the near-field may eliminate resulting far-field components, improving efficiency and EMC.

Figure 8:
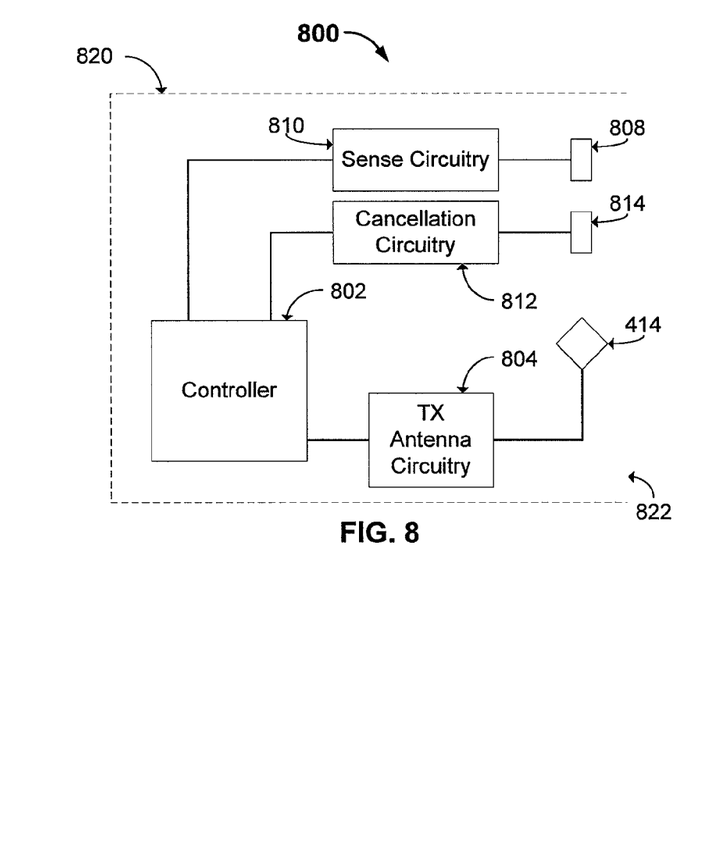
FIG. 8 is a functional block diagram of a wireless power transmitter with active cancellation capability.

FIG. 8 is a functional block diagram of a wireless power transmitter with active cancellation capability. Wireless power transmitter 800 may include shielding 820 with opening 822. Wireless power transmitter 800 includes a controller 802, transmit antenna circuitry 804, transmit antenna 414, sensor 808, sense circuitry 810, cancellation circuitry 812, and emitter 814. Transmit antenna circuitry 804 may include the oscillator 423, the driver circuit 424, the low pass filter 408, the fixed impedance matching circuit 409, and/or the load sensing circuit 416, described above. Sensor 808 is desirably positioned within the near-field of the transmit antenna 414. If shielding 820 is included, sensor 808 may be positioned near the opening 822. During operation of wireless power transmitter 800, sensor 808 may output a signal corresponding to the sensed field. Sense circuitry 810 may be used to impedance match, filter, amplify, and/or sample the sensor signal. A controller 802 may then process the signal, identifying unwanted portions and determining a cancellation signal. Cancellation circuitry 812 may generate, amplify, and/or filter a cancellation waveform based on the cancellation signal. As an example, the cancellation signal may be converted into a cancellation waveform via a digital-to-analog converter. The waveform may then be used to drive the emitter 814 to emit a cancellation field.

Figure 9:
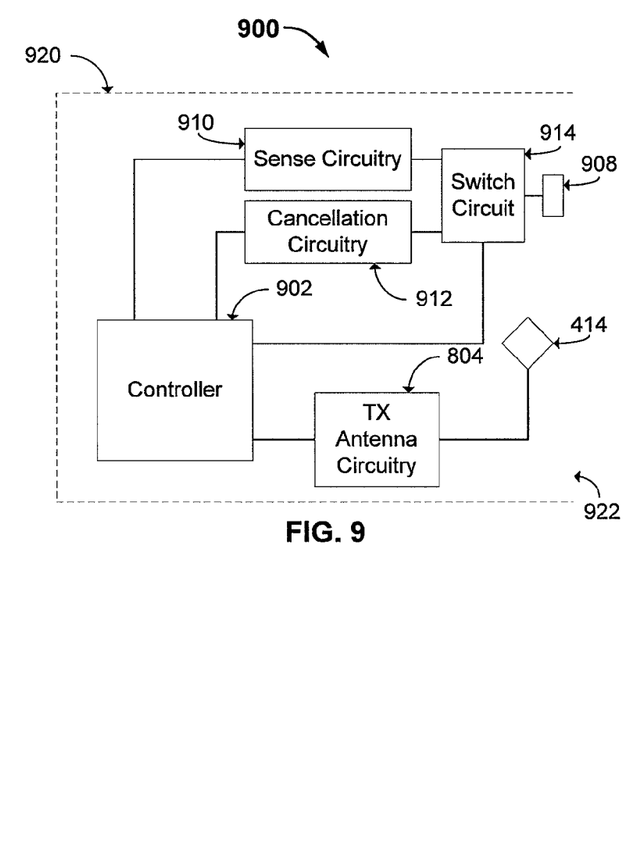
FIG. 9 is a functional block diagram of another wireless power transmitter with active cancellation capability.

FIG. 9 is a functional block diagram of another wireless power transmitter with active cancellation capability. Wireless power transmitter 900 may include shielding 920 with opening 922. Wireless power transmitter 900 includes a controller 902, transmit antenna circuitry 804, transmit antenna 414, sensor/emitter 908, sense circuitry 910, cancellation circuitry 912, and switch circuitry 914. In contrast to the wireless power transmitter 800, the wireless power transmitter 900 uses a single device for sensing the EM field and emitting a cancellation field. Initially, controller 902 may configure switch circuitry 914 to a sensing state. Sense circuitry 910 may be used to impedance match, filter, amplify, and/or sample the sensed signal. A controller 902 may then process the signal, identifying unwanted portions and determining a cancellation signal. After sensing the EM field and determining a cancellation signal, controller 902 may configure switch circuitry 914 to an emitting state. Cancellation circuitry 912 may generate, amplify, and/or filter a cancellation waveform based on the cancellation signal. As an example, the cancellation signal may be converted into a cancellation waveform via a digital-to-analog converter. The waveform may then be used to drive the sensor/emitter 914 to emit a cancellation field. Optionally, after the initial determination of a desired cancellation signal, the controller 902 may periodically sense the EM field and adjust the cancellation signal.

Figure 10:
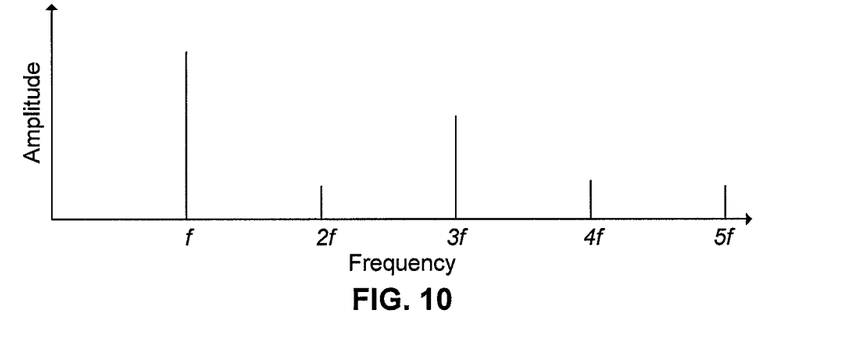
FIG. 10 depicts a frequency domain plot of a sensed H-field.

To illustrate, FIGS. 10-13 depict the active cancellation of an undesired H-field component. FIG. 10 depicts a frequency domain plot of a sensed H-field. To determine frequency content, a controller may use a fast Fourier transform or other suitable algorithm to convert the sampled signal into its frequency domain equivalent. Assuming f is the operating, desired, or resonant frequency of the wireless power system, the second, third, fourth, and fifth harmonics are also present at varying levels. These out-of-band emissions may negatively impact EMC.

Figure 11:
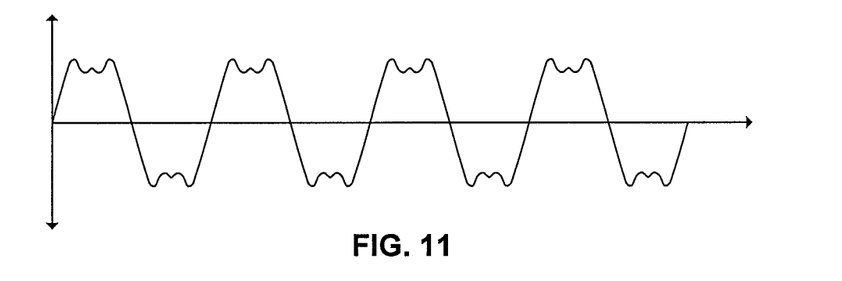
FIG. 11 depicts a time domain plot of the sensed H-field.

FIG. 11 depicts a time domain plot of the sensed H-field. As shown, due to the spectral composition of the H-field, the transmitted H-field may be distorted relative to an ideal sinusoidal oscillation at the resonant frequency of the system. This may result in radiative energy losses in both the transmit and receive antennas and negatively impact the efficiency of the system. A controller may eliminate the third harmonic by generating a signal at that frequency but 180° out of phase.

Figure 12:
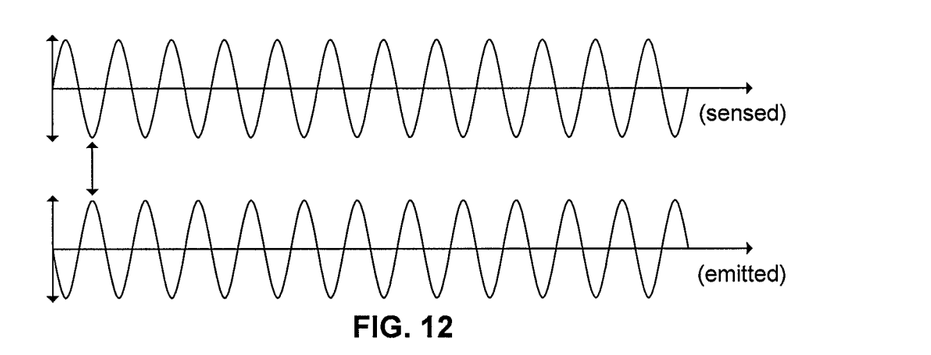
FIG. 12 depicts a signal used to emit a field opposing a harmonic component of the sensed field and the relative phase alignment between the two fields.
Figure 13:
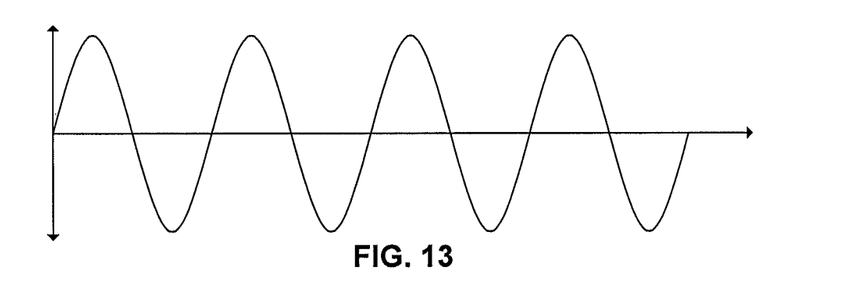
FIG. 13 depicts an ideal H-field oscillation at the resonant frequency of the wireless power system.

FIG. 12 depicts a signal used to emit a field opposing a harmonic component of the sensed field and the relative phase alignment between the two fields. The top signal represents the frequency of the harmonic component of the sensed field, while the bottom signal represents the frequency of a signal used to generate a field opposing the harmonic component. As shown, the top and bottom signals are out of phase. The resulting sum of the two fields ideally approaches zero.

While only a single spectral component was used in this illustration, in practice multiple undesired components may be simultaneously eliminated via the cancellation signal, though care must be taken to avoid cancelling the resonant H-field in areas where a receive antenna may receive power (though this may be desirable in certain circumstances). In doing so, the transmitted H-field of FIG. 11 approaches the ideal resonant field at frequency f, depicted in FIG. 13. While cancellation of the H-field is described above, a similar process may be used to cancel the E-field. It may be desirable to cancel out the E-field at the resonant frequency of the transmitter as well as at any of the harmonics as the E-field does not transfer power in the wireless power transfer systems described herein.

Referring back to FIGS. 8 and 9, sensor 808 and sensor/emitter 908 may sense either E- or H-fields. E-field sensors may include a conductive surface whereas H-field sensors may include a conductive loop. The emitter 814 is of the same type as sensor 808 to cancel the undesirable portion of corresponding sensed field. In the case where an H-field sensor is used, the transmit antenna 414 may act as the emitter by mixing a cancellation signal with the RF signal (e.g., the signal originating at oscillator 423). As the sensing and cancellation is being carried out in the near-field of the transmit antenna 414, it may be desirable to include a plurality of paired sensors 808 and emitters 814 or sensor/emitters 908 to improve the granularity of the sensing and cancellation.

Controllers 802 and 902 may comprise a generic processor or digital signal processor. The processor may be configured to receive data representative of the sensed signal from, for example, an ADC. The processor may then execute a series of operations to determine the undesirable portion of the sensed signal and its converse. For example, the processor may transform the received data via a fast Fourier transform to determine spectral content. After removing any desired frequency component, the processor may phase shift the cancellation signal and generate a cancellation signal via an inverse fast Fourier transform. The appropriate phase shift may be determined based in part on the relative delays of the sense circuitry 810, 910 and cancellation circuitry 812, 912 and/or on the phase of the signal driving the transmit antenna.

Figure 14:
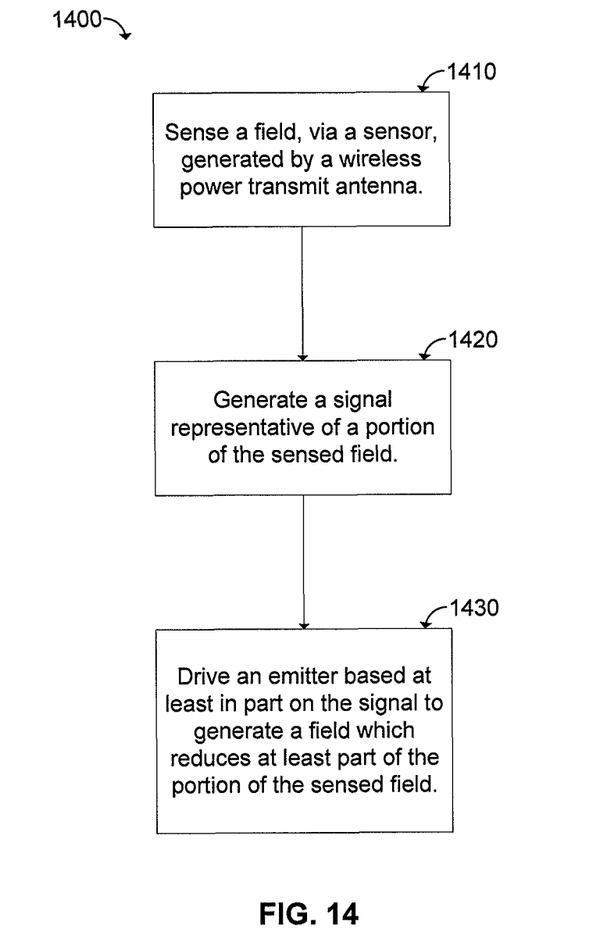
FIG. 14 is a flowchart of an exemplary method for active cancellation.

FIG. 14 is a flowchart of an exemplary method for active cancellation. At block 1410, method 1400 includes sensing a field, via a sensor, generated by a wireless power transmit antenna. The sensor may be of E-field or H-field type, and output a signal representative of the sensed field. At block 1420, a signal is generated representative of a portion of the field sensed in block 1410. The portion of the field may be stray, undesirable, or unintentionally transmitted. Because the wireless power is being transferred via H-field, any sensed E-field may be undesirable. Similarly, any sensed H-field may be undesirable though the frequency component at the resonant frequency of the transmit antenna may be desired for power transfer. The signal may be generated via signal processing in the frequency domain to isolate the spectral components of the sensed field into frequency bands. For each frequency band, the signal processing may include calculating both an amplitude and a phase of a signal to oppose the undesirable component. A summation of these opposing signals and conversion to the time domain may produce the signal representative of the undesired portion of the sensed field. Lastly, at block 1430, an emitter is driven in part based on the generated signal, the emitter generating a field which destructively interferes with the portion of the sensed field such that, when summed with the field generated by the wireless power transmit antenna, the resulting field has reduced or attenuated undesirable components.

Figure 15:
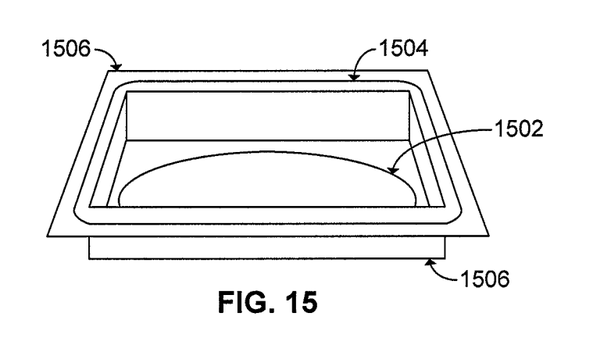
FIG. 15 depicts an exemplary shielded transmitter arrangement with a magnetic field sensor.

FIG. 15 depicts an exemplary shielded transmitter arrangement with an H-field sensor. Transmit antenna 1502 may be disposed in the bottom of a shallow electromagnetic shield enclosure 1506 which includes an opening to permit wireless power transmission. Sensor 1504 may be disposed around the opening of the shield 1506 such that sensor 1504 may measure the field generated by the transmit antenna 1502. Here, sensor 1504 is a conductive loop able to sense an H-field via an induced current. Sensor 1504 may act as an H-field emitter upon determination of the undesirable portion of the H-field. Alternatively, sensor 1504 may continue to sense the transmitted H-field and the RF signal used to energize the transmit antenna 1502 may be adjusted based in part on the undesired frequency components.

Figure 16:
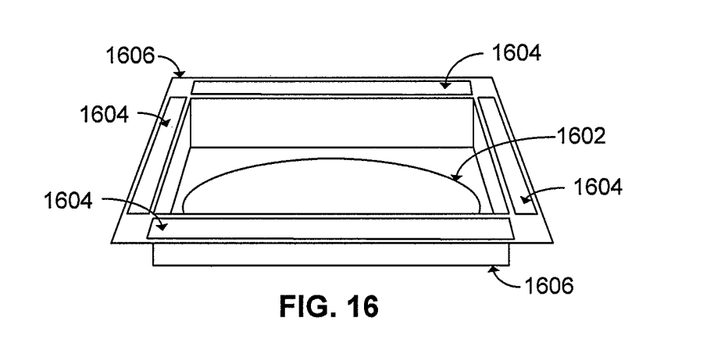
FIG. 16 depicts an exemplary shielded transmitter arrangement with multiple electric field sensors.

FIG. 16 depicts an exemplary shielded transmitter arrangement with multiple E-field sensors. Again, transmit antenna 1602 may be disposed in the bottom of a shallow electromagnetic shield enclosure 1606 which includes an opening to permit wireless power transmission. A plurality of sensors 1604 may be disposed around the opening of the shield 1606 such that the sensors 1604 may measure the field generated by the transmit antenna 1602. Here, sensors 1604 are conductive surfaces able to sense an E-field via an induced voltage. Sensors 1604 may further act as E-field emitters upon determination of the undesirable portion of the E-field (e.g., as described with respect to FIG. 9). Alternatively, adjacent sensors may be paired such that one acts as a sensor and the other as an emitter (e.g., as described with respect to FIG. 8).

Figure 17:
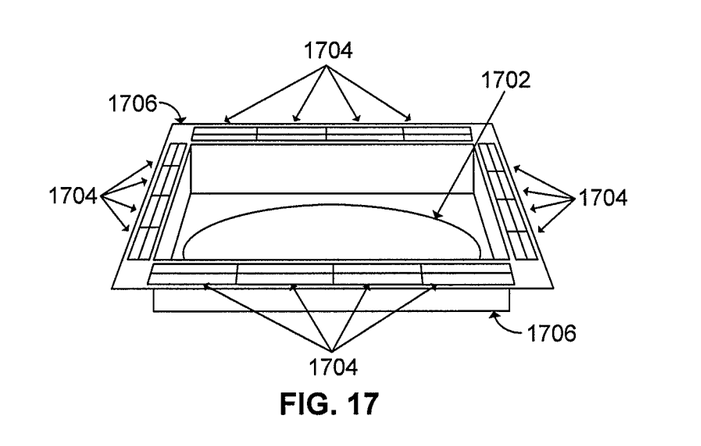
FIG. 17 depicts another exemplary shielded transmitter arrangement with multiple electric field sensors.

FIG. 17 depicts another exemplary shielded transmitter arrangement with multiple E-field sensors. Transmit antenna 1702 may be disposed in the bottom of a shallow electromagnetic shield enclosure 1706 which includes an opening to permit wireless power transmission. A plurality of sensors 1704 may be disposed around the opening of the shield 1706 such that the sensors 1704 may measure the field generated by the transmit antenna 1702. Sensors 1704 may further act as E-field emitters upon determination of the undesirable portion of the E-field (e.g., as described with respect to FIG. 9). Alternatively, adjacent sensors may be paired such that one acts as a sensor and the other as an emitter (e.g., as described with respect to FIG. 8). In order to improve the cancellation of undesired portions of the field emitted by the transmit antenna 1702, the size of the sensors may be reduced and the number of sensors increased (e.g., compare sensors 1604 to sensors 1704).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a means for sensing may include E-field or H-field sensors, described above. The means for sensing may further include sense circuitry, also described above. A means for generating a signal may encompass a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A means for emitting may E-field or H-field emitters, described above, which may in some configurations also acts as sensors. The means for emitting may further include cancellation circuitry, also described above.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing unwanted emissions in a system for wirelessly transferring power via a magnetic field at a resonant frequency, the method comprising:
   generating a first field, via a wireless power transmit antenna of a wireless power transmitter, wherein the first field comprises at least a magnetic field for wirelessly transferring the power and an undesired field portion;
   sensing the first field, via a sensor comprising a conductive component of the wireless power transmitter different from the wireless power transmit antenna, wherein the conductive component is electrically connected to a controller circuit of the wireless power transmitter via a sense circuit;
   generating, by the controller circuit of the wireless power transmitter, a signal indicative of the undesired field portion of the sensed first field;
   operating a switching circuit configured to selectively electrically connect the conductive component to the controller via either the sense circuit or a cancellation circuit, such that the conductive component is electrically connected to the controller via the cancellation circuit instead of the sense circuit; and
   driving, by the controller circuit, the conductive component of the wireless power transmitter via the cancellation circuit, based at least in part on the signal to generate a second field which reduces at least part of the undesired field portion of the sensed first field.

2. The method of claim 1, wherein the driving includes adjusting an amplitude of the generated signal.

3. The method of claim 1, wherein the undesired field portion of the sensed first field comprises at least an electric field.

4. The method of claim 1, wherein the generating comprises:
   sampling the sensor to generate a sensed field data set;
   processing the sensed field data set to produce a cancellation data set; and
   converting the cancellation data set into the signal.

5. The method of claim 4, wherein the processing includes determining an amplitude and a phase of a spectral component of the sensed field data set, and wherein the cancellation data set is based at least in part on the amplitude and the phase of the spectral component.

6. The method of claim 4, wherein the cancellation data set does not include a spectral component having a frequency at the resonant frequency.

7. The method of claim 1, wherein the undesired field portion comprises at least an undesired magnetic field, and the second field comprises at least a magnetic field which reduces at least part of the undesired magnetic field.

8. An apparatus for reducing unwanted emissions in a system for wirelessly transferring power via a magnetic field at a resonant frequency, the apparatus comprising:
   a wireless power transmit antenna configured to generate a first field comprising at least a magnetic field for wirelessly transferring the power and an undesired field portion;
   a conductive component different from the wireless power transmit antenna;
   a controller;
   a switching circuit configured to selectively electrically connect the conductive component to the controller via either a sense circuit or a cancellation circuit, wherein the conductive component is configured to sense the first field when electrically coupled to the controller via the sense circuit, and wherein the controller is configured to generate a signal indicative of the undesired field portion of the sensed first field;
   wherein the controller is further configured to, when electrically connected to the conductive component via the cancellation circuit, drive the conductive component to generate a second field based at least in part on the signal, the second field reducing at least part of the undesired field portion of the sensed first field.

9. The apparatus of claim 8, further comprising circuitry configured to adjust an amplitude of the generated signal.

10. The apparatus of claim 8, wherein the undesired field portion of the sensed first field is comprises at least an electric field.

11. The apparatus of claim 8, further comprising an electromagnetic shield enclosing at least a portion of the wireless power transmit antenna, the electromagnetic shield including an opening.

12. The apparatus of claim 11, wherein the sensor is located on a surface of the electromagnetic shielding adjacent to the opening.

13. The apparatus of claim 8, wherein the controller is further configured to:
sample the sensor to generate a sensed field data set;
process the sensed field data set to produce a cancellation data set; and
convert the cancellation data set into the signal.

14. The apparatus of claim 13, wherein the controller is further configured to determine an amplitude and a phase of a spectral component of the sensed field data set, and wherein the cancellation data set is based at least in part on the amplitude and the phase of the spectral component.

15. The apparatus of claim 13, wherein the cancellation data set does not include a spectral component having a frequency at the resonant frequency.

16. An apparatus for reducing unwanted emissions in a system for wirelessly transferring power via a magnetic field at a resonant frequency, the apparatus comprising:
first means for generating a first field comprising a magnetic field for wirelessly transferring the power and an undesired field portion;
means for sensing the first field comprising a conductive component different from the first generating means;
second means for generating a signal indicative of the undesired field portion of the sensed first field, wherein the conductive component is electrically connected to the second generating means via a sense circuit;
switching means for selectively electrically connecting the conductive component to the second generating means from via the sense circuit to via a cancellation circuit;
wherein the conductive component is further configured to, when electrically connected to the second generating means via the cancellation circuit, emit a second field, based at least in part on the signal, to reduce at least part of the undesired field portion of the sensed first field.

17. The apparatus of claim 16, further comprising means for shielding the wireless power transmit antenna.

18. The apparatus of claim 17, wherein the means for sensing is located on a surface of the means for shielding.

19. The apparatus of claim 16, further comprising:
means for sampling the means for sensing to generate a sensed field data set;
means for processing the sensed field data set to produce a cancellation data set; and
means for converting the cancellation data set into the signal.

20. The apparatus of claim 19, wherein the means for processing is further configured to determine an amplitude and a phase of a spectral component of the sensed field data set, and wherein the cancellation data set is based at least in part on the amplitude and the phase of the spectral component.

21. An apparatus for reducing unwanted emissions in a system for wirelessly transferring power, the apparatus comprising:
a wireless power transmit antenna comprising a resonant circuit and configured to generate a magnetic field at a frequency corresponding to a resonant frequency of the resonant circuit;
a circuit configured to receive information from a sensor configured to sense one or more components of the magnetic field, the circuit further configured to, based on the one or more sensed components of the magnetic field, generate a signal that is a combination of one or more signals corresponding to one or more frequency bands different than the frequency of the magnetic field used for power transfer, the one or more signals having amplitudes and phases that oppose an undesirable component of the magnetic field for the respective frequency bands;
a conductive component different from the wireless power transmit antenna and operably coupled to the circuit, the conductive component configured be driven with the signal and generate a field that destructively interferes with the undesirable component of the magnetic field.

22. The apparatus of claim 21, wherein the circuit is further configured to determine one or more spectral components of the magnetic field within the one or more frequency bands different than the frequency of the magnetic field used for power transfer.

23. The apparatus of claim 21, wherein the circuit is further configured to determine the one or more signals by removing a desired frequency component corresponding to the frequency of the magnetic field used for power transfer from the sensed one or more components of the magnetic field.

* * * * *